United States Patent [19]

Yasui et al.

[11] Patent Number: 5,176,593
[45] Date of Patent: Jan. 5, 1993

[54] SPEED CHANGING MECHANISM INCLUDING PLANET GEARS AND ONE-WAY CLUTCH

[75] Inventors: Tadashi Yasui; Shinichi Miyamoto, both of Kyoto, Japan

[73] Assignee: The Japan Storage Battery Co., Ltd., Kyoto, Japan

[21] Appl. No.: 812,940

[22] Filed: Dec. 24, 1991

[30] Foreign Application Priority Data

Dec. 26, 1990 [JP] Japan ................... 2-414653

[51] Int. Cl.⁵ .............................................. F16H 3/00
[52] U.S. Cl. ...................................... 475/297; 475/298
[58] Field of Search ............... 475/269, 275, 279, 290, 475/292, 296, 297, 298

[56] References Cited

U.S. PATENT DOCUMENTS

| 832,442 | 10/1906 | Archer | 475/297 |
|---|---|---|---|
| 2,380,390 | 7/1945 | Banker | 475/297 X |
| 2,787,173 | 4/1957 | Bergles | 475/298 X |
| 3,430,521 | 3/1969 | Kulman | 475/269 X |
| 3,477,314 | 11/1969 | Rutkowski | 475/296 |
| 4,063,469 | 12/1977 | Bergles | 475/297 |
| 4,938,738 | 7/1990 | Fuelberth et al. | 475/269 X |
| 5,019,023 | 5/1991 | Kurosawa | 475/269 |

FOREIGN PATENT DOCUMENTS

| 62-173180 | 7/1987 | Japan . | |
|---|---|---|---|
| 62-297006 | 12/1987 | Japan . | |
| 101546 | 5/1988 | Japan | 475/290 |

Primary Examiner—Rodney H. Bonck
Assistant Examiner—Khoi Q. Ta
Attorney, Agent, or Firm—Sughrue, Mion, Zinn, Macpeak & Seas

[57] ABSTRACT

A speed changing mechanism for use with an electric rotary tool, an electric press-attaching tool, an automatic screw tightening tool or the like, includes planet gears, a planet gear support plate integrally formed with an internal gear and provided with an external gear formed outwardly of the internal gear. The planet gears are rotatably supported by a second planet gear support plate mounted on a driven shaft and formed with a second external gear. The planet gears are engaged with the interanl gear and a sun gear provided on a one-way clutch. A cylindrical member having an internal gear is slidably fitted with at least one of the first and second external gears. The speed changing mechanism can be set to have a ratio of the rapid rotation speed to the slow rotation speed of 2.5/1 or less.

14 Claims, 2 Drawing Sheets

SPEED CHANGING MECHANISM INCLUDING PLANET GEARS AND ONE-WAY CLUTCH

The present invention relates to a speed changing mechanism which includes planet gears and is used with an electric rotary tool, an electric press-attaching tool, an automatic screw tightening tool or the like. More particularly, the invention relates to a speed changing mechanism which includes planet gears and a one-way clutch and is used with the above-mentioned tools.

BACKGROUND OF THE INVENTION

Since a speed changing mechanism which includes planet gears has a simple construction and the input and output shafts of the mechanism can be disposed coaxially, the mechanism has been widely used as a speed reducer for an electric rotary tool such as an electric screwdriver, an electric screw tightener or a vibratory drill. Such speed changing mechanisms are disclosed in Japanese Patent Unexamined Publication Nos. Sho. 62-173180 and 62-297006. Due to the gear combination of each of these conventional speed changers, the ratio of the rapid rotation speed of the mechanism to the slow rotation speed thereof is 2.5 or greater, and cannot be set to a value as small as 1.5.

There has been developed an electric press-attaching tool including an automatic speed changing mechanism, which is powered by a battery, and a hydraulic pump, which is driven by the mechanism. The tool need not have a separately disposed pump, a separately laid pressure-proof hose or a manipulation lever for increasing the working oil pressure. The tool's operation is unrestricted by the movement of the user thereof, and is easily handled.

If a force for pressing and deforming a press-attachable terminal or sleeve or the like by the tool is to be weak, such as when connecting thin electric wires or a small number thereof together by the terminal or sleeve or the like, the tool's rotational frequency is increased, thereby decreasing the output torque thereof and shortening the tool's working time. In contrast, if a strong force is required such as when connecting thick electric wires or a large number of electric wires together by the terminal or sleeve or the like, the tool's rotational frequency is automatically decreased, thereby increasing the output torque thereof. Thus, the force magnitude can be adjusted appropriately for the work to be performed by the tool.

In such an automatic speed changer which can increase its rotational frequency to decrease the output torque thereof and shorten working time and which can decrease its rotational frequency to increase the output torque, to efficiently apply an appropriate working force, a ratio of the mechanism's rapid rotation speed to the slow rotation speed thereof must be set to approximately 1.5. As discussed above, the conventional speed changing mechanisms do not meet this requirement, and thus a problem arises in that an appropriate working force is not applied to a workpiece.

SUMMARY OF THE INVENTION

The present invention was designed to solve the above-mentioned problem. Accordingly, it is an object of the invention to provide a speed changing mechanism which can be set to have a ratio of its rapid rotation speed to its slow rotation speed to 2.5 or less, thereby allowing the speed changing mechanism to be used as a drive system for a machine, such as an electric press-attaching tool, having little difference between its rapid rotation speed and its slow rotation speed.

The inventive speed changing mechanism includes: planet gears; a first planet gear support plate integrally formed with an internal gear and provided with a first fitting mechanism, such as an external gear, formed outwardly of the internal gear; a second planet gear support plate which is mounted on a driven shaft and integrally formed with a second fitting mechanism, such as an external gear, which has an equivalent structure to that of the first fitting mechanism and by which the planet gears engaged with the internal gear are rotatably supported; a cylindrical member including a mechanism such as an internal gear, which is slidably fitted with at least one of the two fitting mechanisms formed on the two planet gear support plates; and a one-way clutch which is mounted with a sun gear engaged with the planet gears and which is rotatable in exclusively one direction.

Further, the above-noted and other objects can also be attained by a speed changing mechanism comprising: a rotatable member having an internal gear; a planet gear carrier coaxially provided with the rotatable member and securely fixed to an output shaft; planet gears rotatably supported on the planet gear carrier and meshed with the internal gear; a sun gear coaxially provided with the rotatable member and meshed with the planet gears; a one-way clutch for enabling the sun gear to be rotated in exclusively one direction; and a coupling mechanism for operatively, selectively coupling the rotatable member to the planet gear carrier to rotate the rotatable member and the planet gear carrier together. A rotational torque transmitted to the rotatable member is directly transmitted from the rotatable member to the planet carrier when the rotatable member is coupled to the planet gear carrier by the coupling mechanism. A rotational torque transmitted to the rotatable member is increased and transmitted from the rotatable member to the planet gear carrier through the planet gears meshed with the sun gear which is prevented by the one-way clutch from being rotated when the rotatable member is not coupled to the planet gear carrier by the coupling mechanism.

The coupling mechanism preferably includes a first external gear formed on the rotatable member outwardly of the internal gear, a second external gear formed on a peripheral portion of the planet gear carrier, and a cylindrical member fitted around the rotatable member and the planet carrier and slidable thereon so that the first external gear selectivele engages and disengages the second external gear by the cylindrical member.

The cylindrical member preferably includes an internal gear engageable with the first and second external gears.

DETAILED DESCRIPTION OF THE PREFERRED EMBODIMENT

An embodiment of the present invention is hereafter described with reference to the drawings attached hereto.

Figure 1:
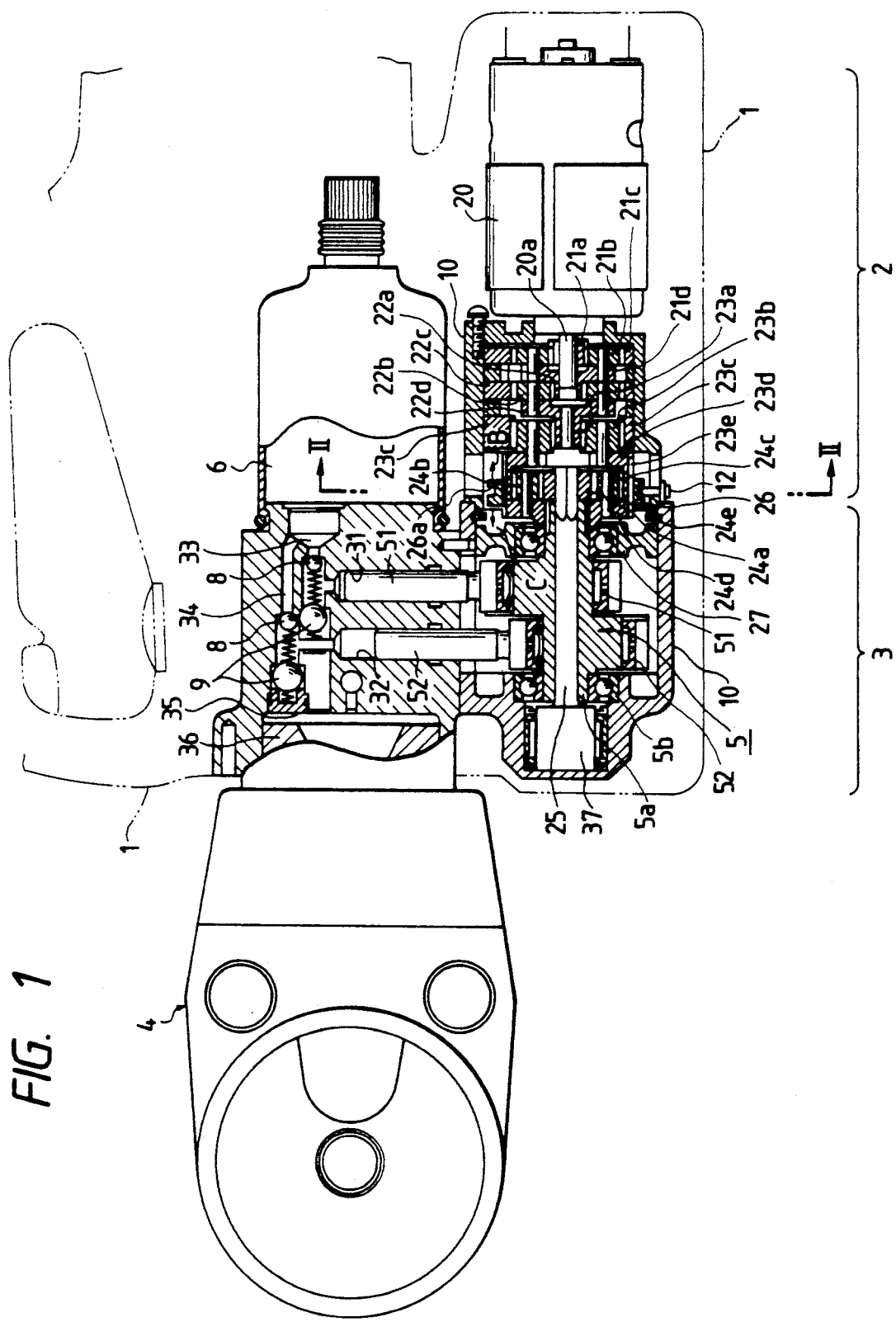
FIG. 1 is a partial and axial sectional side view of an electric press-attaching tool having an automatic speed changing mechanism according to an embodiment of the present invention.

FIG. 1 is a partial and axial sectional side view of an electric press-attaching tool having an automatic speed changing mechanism which is an embodiment of the present invention and which includes planet gears and a one-way clutch. The tool includes a cover 1, an automatic speed changing mechanism unit 2, a hydraulic pump 3, a head 4, and a gear case 10. The automatic speed changing mechanism unit 2 includes an electric motor 20, and the automatic speed changing mechanism.

The automatic speed changing mechanism includes a first-stage sun gear 21a, first-stage planet gears 21b, a first-stage internal gear 21c, a first-stage planet gear support plate 21d, a second-stage sun gear 22a, second-stage planet gears 22b, a second-stage internal gear 22c, a second-stage planet gear support plate 22d, a third-stage sun gear 23a, third-stage planet gears 23b, a third-stage internal gear 23c, a third-stage planet gear support plate 23d, an external gear 23e, a fourth-stage sun gear 24a, fourth-stage planet gears 24b, a fourth-stage internal gear 24c, a fourth-stage planet gear support plate 24d, an external gear 24e, a one-way clutch shaft 25, and an internal gear 26. The sun gears, the planet gears and the internal gear are rotated by the electric motor 20 when the motor is driven by a portable battery (not shown in the drawings).

The first-stage sun gear 21a is mounted on the rotary shaft 20a of the motor 20 and is securely fixed thereto. The first-stage planet gears 21b are engaged with the first-stage sun gear 21a and the first-stage internal gear 21c secured to the gear case 10 which is a cylindrical member. The first-stage planet gears 21b are rotatably supported by the first-stage planet gear support plate 21d integrally formed with the second-stage sun gear 22a on the central portion of the plate opposite the planet gears.

The second-stage planet gears 22b are engaged with the second-stage sun gear 22a and the second-stage internal gear 22c secured to the gear case 10, and are rotatably supported by the second-stage planet gear support plate 22d integrally formed with the third-stage sun gear 23a on the central portion of the plate opposite the planet gears.

The third-stage planet gears 23b are engaged with the third-stage sun gear 23a and the third-stage internal gears 23c secured to the gear case 10, and are rotatably supported by the third-stage planet gear support plate 23d integrally formed with the fourth-stage internal gear 24c and the external gear 23e.

The fourth-stage planet gears 24b are engaged with the fourth-stage internal gear 24c, and are rotatably supported by the fourth-stage planet gear support plate 24d integrally formed with the external gear 24e and spline-coupled to an eccentric shaft 5. The fourth-stage sun gear 24a is mounted on the one-way clutch shaft 25 at one end thereof and securely fixed thereto. The internal gear 26 is engaged with either both the external gears 23e and 24e or with only the external gear 23e, by a sliding mechanism described hereinafter. The one-way clutch shaft 25 is coupled at the other end thereof with a one-way clutch 37 in the gear case 10 so that the shaft can be rotated in only one direction.

The hydraulic pump 3 includes the eccentric shaft 5, and a hydraulic circuit between an oil tank 6 and the head 4 of the tool, and pump 3 applies high pressure to the head. The eccentric shaft 5, which is spline-coupled to the fourth-stage planet gear support plate 24d of the automatic speed changing mechanism, includes a central portion 5a, and two eccentric portions 5b having different angular positions. The shaft 5 is rotatably supported at one end thereof with a roller bearing in an outer ring 27 fitted in the gear case 10, and is rotatably supported at another end thereof with a roller bearing in the gear case.

The hydraulic pump 3 also includes cam plungers 51, 52 mounted at first ends thereof on needle bearings on the eccentric portions 5b of the shaft 5, and fitted at the second ends thereof in first and second cylindrical chambers 31, 32 so that the plungers are reciprocated therein as the shaft is rotated. With the reciprocation of the plungers, working oil is sent from the oil tank 6 to the first cylindrical chamber 31 through a check valve 8 and a first feed passage 33, or to the second cylindrical chamber 32 through another check valve 8 and a second oil feed passage 34, so that the oil pressure is increased. The pressurized oil is conveyed to a cylindrical chamber 35 through a check valve 9 so that a piston 36 fitted in the chamber formed in the front portion of the hydraulic pump 3 is pushed to press and deform a press-attachable terminal (or the like) on the tool head 4 to connect electric wires or the like together by the terminal.

Figure 2:
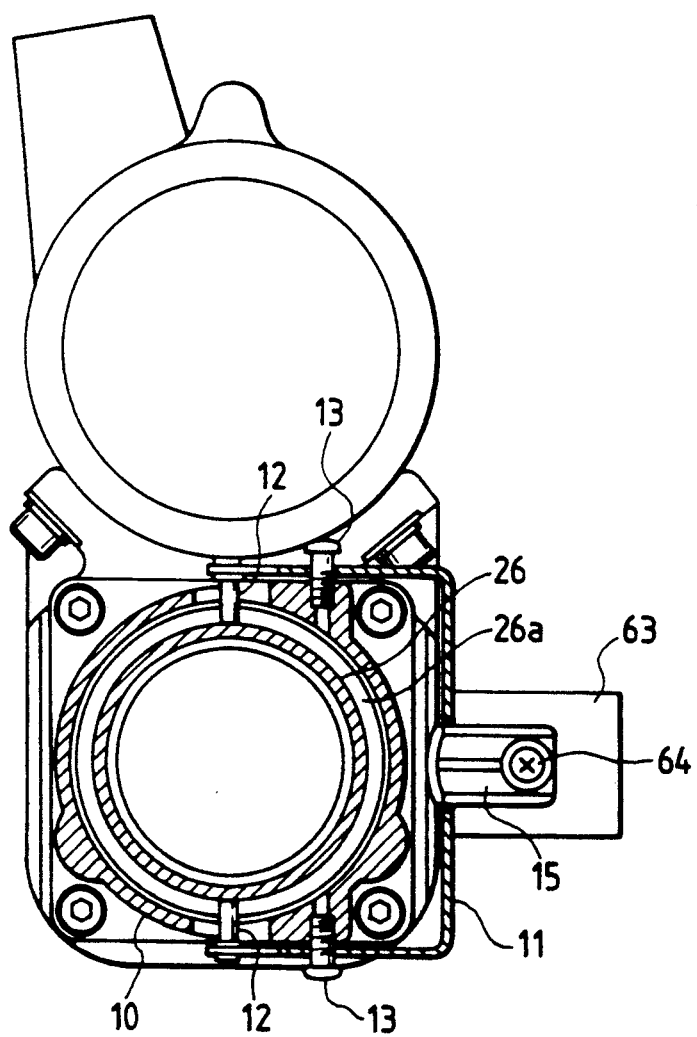
FIG. 2 is a sectional view of the mechanism taken along line II—II in FIG. 1, but with certain components (e.g., the planet gears) of the mechanism not illustrated.

The operation of the automatic speed changing mechanism is described hereinbelow with reference to FIGS. 1 and 2. FIG. 2 is a sectional view of the mechanism along lines II—II of FIG. 1, but with certain components not shown (e.g., the planet gears, etc.). The magnitude of the torque transmitted from the mechanism to the eccentric shaft 5 of the hydraulic pump 3 as the shaft 5 is rotated with the fourth-stage planet gear support plate 24d can be adjusted by sliding the internal gear 26 in first or second directions (i.e., in the directions of arrows B or C shown in FIG. 1).

To slide the internal gear 26, a shift lever 11 is disposed outside the gear case 10 and is coupled at both its ends to pins 12 fitted in a groove 26a provided in the peripheral surface of the internal gear 26 and extending in the circumferential direction thereof, as shown in FIG. 2. The shift lever 11 is pivoted about screw pins 13 engaged in the tapped holes of the gear case. The pivoting operation is performed by a solenoid actuator 63, having a pin 64 coupled at an end thereof to a link 15 coupled to the central portion of the shift lever 11, which is driven by a prescribed electrical current. Juts (e.g., a projecting member) may be provided instead of the screw pins 13.

When the internal gear 26 is in the position C shown in FIG. 1 and the motor 20 is driven, the internal gear 26 is engaged with the external gear 23e on the third-stage planet gear support plate 23d and the external gear 24e on the fourth-stage planet gear support plate 24d and rotates both the support plates together. The fourth-stage planet gears 24b rotatably supported by the fourth-stage planet gear support plate 24d and engaged with the fourth-stage sun gear 24a, are revolved together with the sun gear around the axis thereof but not rotated around the axes of the planet gears. Consequently, the speed changing mechanism does not perform a speed reducing action.

At that time, the sun gear 24a is rotated in such a direction to allow the one-way clutch 37 to rotate, and the fourth-stage planet gear support plate 24d is rapidly rotated. The torque transmitted from the mechanism to the eccentric shaft 5 has a low magnitude, and the working oil pressure generated in the hydraulic circuit of the pump 3 is low. Thus, a weak press-attaching force is applied to the tool head 4, and the piston 36 is rapidly moved, thereby making the time required for the press-attaching operation of the terminal or the like relatively short.

When the internal gear 26 is in position B shown in FIG. 1 and the motor 20 is driven, the internal gear 26 engages the external gear 23e on the third-stage planet gear support plate 23d, but does not engage the external gear 24e on the fourth-stage planet gear support plate 24d, and the fourth-stage sun gear 24a receives torque in such a direction that the one-way clutch 37 does not rotate. Thus, the rotation of the fourth-stage sun gear 24a is hindered by the clutch.

At that time, the fourth-stage sun gear 24a, the fourth-stage internal gear 24c integrally formed on the third-stage planet gear support plate 23d, and the fourth-stage planet gears 24b form a speed reducer which receives input torque at the internal gear and sends out output torque at the planet gears, and the fourth-stage planet gear support plate 24d is slowly rotated.

As a result, the eccentric shaft 5 spline-coupled to the fourth-stage planet gear support plate 24d is also slowly rotated, the torque transmitted from the speed changing mechanism to the shaft has a high magnitude, the oil pressure generated in the hydraulic circuit has a high magnitude, and a strong press-attaching force is applied to the tool head 4. The speed reduction ratio I of the speed reducer is expressed by the equation as follows:

$$I = i_0/(1 - i_0).$$

In the equation $i_0$ denotes the ratio of the number of teeth of the fourth-stage internal gear 24c to that of the teeth of the fourth-stage sun gear 24a. If the ratio $i_0$ is 2, the speed reduction ratio I is 1/1.5. Thus the ratio of the above-mentioned rapid rotation speed to the above-mentioned slow rotation speed can be set at 1.5/1.

Thus, a press-attaching force appropriate for the load on the tool head 4 can be efficiently applied thereto.

A speed changing mechanism provided according to the present invention and including a one-way clutch and planet gears has a simple and compact construction. Additionally, the mechanism's input shaft and output shaft can be disposed coaxially. In contrast to the present invention, the conventional speed changing mechanism which includes planet gears and is provided in an electric rotary tool or the like has a ratio of the mechanism's rapid rotation speed to its slow rotation speed which cannot be set below 2.5. Thus, even assuming work can be efficiently performed by the rapid rotation, work cannot be performed efficiently by the slow rotation.

Additionally, the conventional mechanism's output torque is high enough at its slow rotation speed, but not at its rapid rotation speed. Thus, the conventional mechanism cannot be used to drive an electric press-attaching tool or the like, which must be set to have a small ratio of its rapid rotation speed to its slow rotation speed. However, this problem of the conventional system is solved by the inventive speed changing mechanism being applied to the electric press-attaching tool or the like. Hence, the inventive speed changing mechanism can be operated optimally depending on the load on such a tool, and hence the inventive speed changing mechanism can drive various machines in which input and output shafts thereof need to be disposed coaxially and the ratio of the machine's rapid rotation speed to its slow rotation speed must be set at no more than 2.5.

Although the present invention has been fully described by way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A speed changing mechanism, comprising:
a plurality of planet gears;
a first planet gear support plate integrally formed with a first internal gear and provided with a first fitting member formed radially outwardly of said first internal gear, said plurality of planet gears being adapted to engage said first internal gear;
a second planet gear support plate mounted on a driven shaft and integrally formed with a second fitting member and rotatably supporting said plurality of planet gears engaged with said first internal gear;
a cylindrical member including a mechanism for being slidably and selectively fitted either with only said first fitting member or with both said first and second fitting members formed on said first and second planet gear support plates, wherein, when said mechanism is fitted with only said first fitting member, a torque transmitted from said mechanism to said driven shaft is greater than that when said mechanism is fitted with both said first and second fitting members; and
a one-way clutch which is mounted with a sun gear engageable with said plurality of planet gear, said one-way clutch being rotatable in one direction exclusively.

2. A speed changing mechanism according to claim 1, wherein said first fitting member comprises an external gear.

3. A speed changing mechanism according to claim 1, wherein said second fitting member comprises an external gear.

4. A speed changing mechanism according to claim 1, wherein said mechanism for being slidably fitted comprises a third internal gear.

5. A speed changing mechanism, comprising:
a plurality of planet gears;
a first planet gear support plate integrally formed with a first internal gear and provided with a first fitting member formed radially outwardly of said first internal gear, said plurality of planet gears being adapted to engage said first internal gear;
a second planet gear support plate mounted on a driven shaft and integrally formed with a second fitting member and rotatably supporting said plurality of planet gears engaged with said first internal gear;
a cylindrical member including a mechanism for being slidably and selectively fitted either with only said first fitting member or with both said first and second fitting members formed on said first and second planet gear support plates; and a one-way clutch which is mounted with a sun gear engageable with said plurality of planet gears, said one-way clutch being rotatable in one direction exclusively.

wherein said mechanism for being slidably and selectively fitted comprises a third internal gear, said speed changing mechanism being adapted for use with an eccentric shaft of a hydraulic pump, wherein said eccentric shaft is rotated with said second planet gear support plate, a magnitude of torque transmitted from said speed changing mechanism to said eccentric shaft being adjustable by sliding said internal gear in first and second directions.

6. A speed changing mechanism, comprising:

a plurality of planet gears;

a first planet gear support plate integrally formed with a first internal gear and provided with a first fitting member formed radially outwardly of said first internal gear, said plurality of planet gears being adapted to engage said first internal gear;

a second planet gear support plate mounted on a driven shaft and integrally formed with a second fitting member and rotatably supporting said plurality of planet gears engaged with said first internal gear;

a cylindrical member including a mechanism for being slidably and selectively fitted either with only said first fitting member or with both said first and second fitting members formed on said first and second planet gear support plates;

a one-way clutch which is mounted with a sun gear engageable with said plurality of planet gears, said one-way clutch being rotatable in one direction exclusively, wherein said mechanism for being slidably and selectively fitted comprises a third internal gear; and a shift lever having first and second ends coupled to said third internal gear and extending in a circumferential direction thereof.

7. A speed changing mechanism according to claim 6, wherein said shift lever is coupled to said third internal gear by pins fitted in a groove provided in said third internal gear.

8. A speed changing mechanism according to claim 7, further comprising a gear casing having tapped holes, and projecting members engaged in said tapped holes of said gear casing, wherein said shift lever is pivoted about said projecting members.

9. A speed changing mechanism according to claim 8, wherein said projecting members comprise screw pins.

10. A speed changing mechanism, comprising:

a rotatable member having an internal gear;

a planet gear carrier coaxially provided with said rotatable member and securely fixed to an output shaft;

a plurality of planet gears rotatably supported on said planet gear carrier and meshed with said internal gear;

a sun gear coaxially provided with said rotatable member and meshed with said plurality of planet gears;

a one-way clutch for enabling said sun gear to rotate in one direction exclusively; and a coupling member for selectively coupling said rotatable member to said planet gear carrier to rotate said rotatable member and said planet gear carrier together, wherein a rotational torque transmitted to said rotatable member is directly transmitted from said rotatable member to said planet gear carrier when said rotatable member is coupled to said planet gear carrier by said coupling member, and wherein a rotational torque transmitted to said rotatable member is increased and transmitted from said rotatable member to said planet gear carrier through said plurality of planet gears meshed with said sun gear prevented by said one-way clutch from being rotated when said rotatable member is not coupled to said planet gear carrier by said coupling member.

11. A speed changing mechanism according to claim 10, wherein said coupling member includes a first external gear formed on said rotatable member outwardly of said internal gear, a second external gear formed on a peripheral portion of said planet gear carrier, and a cylindrical member slidably fitted around said rotatable member and said planet gear carrier such that said first external gear is selectively engageable with said second external gear.

12. A speed changing mechanism according to claim 11, wherein said cylindrical member includes an internal gear engageable with said first and second external gears.

13. A speed changing mechanism according to claim 11, further comprising:

a member for moving said cylindrical member to slide said rotatable member and said planet gear carrier.

14. A speed changing mechanism according to claim 13, wherein said member for moving said cylindrical member comprises a shift lever.

* * * * *